(12) United States Patent
Hayashi

(10) Patent No.: US 7,345,835 B2
(45) Date of Patent: Mar. 18, 2008

(54) LENS BARREL

(75) Inventor: Kunihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 10/570,703

(22) PCT Filed: Sep. 30, 2004

(86) PCT No.: PCT/JP2004/014803

§ 371 (c)(1),
(2), (4) Date: Mar. 3, 2006

(87) PCT Pub. No.: WO2005/033761

PCT Pub. Date: Apr. 14, 2005

(65) Prior Publication Data

US 2006/0285232 A1  Dec. 21, 2006

(30) Foreign Application Priority Data

Oct. 2, 2003 (JP) ............................. 2003-344838

(51) Int. Cl.
*G02B 7/02* (2006.01)
*G02B 15/14* (2006.01)

(52) U.S. Cl. ...................... 359/823; 359/824; 359/694; 359/814

(58) Field of Classification Search ................ 359/823, 359/824, 811, 814, 694
See application file for complete search history.

(56) References Cited

U.S. PATENT DOCUMENTS 5,748,394 A * 5/1998 Shimazaki et al. ......... 359/823
5,828,503 A * 10/1998 Kaneda et al. .............. 359/824

FOREIGN PATENT DOCUMENTS

| JP | 06-174998 | 6/1994 |
| JP | 08-149777 | 6/1996 |
| JP | 08-248293 | 9/1996 |
| JP | 2000-137156 | 5/2000 |

* cited by examiner

*Primary Examiner*—M. Hasan
(74) *Attorney, Agent, or Firm*—Bell, Boyd & Lloyd LLP

(57) ABSTRACT

A lens barrel is provided which has a compact inner lens mechanism and is able to be manufactured in a small size at low cost. In the lens barrel according to the present invention, a number of shafts can be reduced by making a guiding shaft to be a common guiding shaft. In addition, a guiding shaft is formed only within a moving range of a zoom movable member, and a coil unit is disposed in a space positioned behind the guiding shaft, hence the whole lens barrel can be made compact. On the other hand, since the guiding shaft and a guiding shaft are formed separately, a sleeve section of the zoom movable member and a sleeve section of a focus movable member are made to have sufficient lengths, and also a sufficient length for sliding the respective movable members can be obtained.

9 Claims, 2 Drawing Sheets

LENS BARREL

CROSS REFERENCE TO RELATED APPLICATIONS

The present application claims priority to Japanese Patent Document No. P2003-344838 filed on Oct. 2, 2003, the disclosure of which is herein incorporated by reference.

The present invention relates to a lens barrel having a forward/backward mechanism of a lens in an optical axis direction.

In recent years, in response to the demands for miniaturization of a zoom lens used in video cameras and digital still cameras, there has been proposed a technique of using a guiding shaft provided for movement of two movable members (for zooming and focusing) in common, and the technique has been practically used.

As such a technique, two guiding shafts are generally prepared for each movable member, and one of the shafts is used as a positioning shaft for positioning and the other shaft is used as a rotation-restricting shaft for correcting direction. When these two guiding shafts are independently provided, four guiding shafts are needed to operate two movable members. However, in order to miniaturize a lens unit, it has been practice to make the guiding shafts to be used in common (for example, refer to Japanese Patent Application Publication No. HEI8-149777).

In this technique, by using each guiding shaft in common, two movable members can be held by two guiding shafts. In this case, it is required to consider a holding mechanism so that movement areas of respective movable members do not overlap each other. In general, when a lens barrel is designed so as not to overlap the movement areas, the lens barrel becomes longer in an optical axis direction. In addition, if a guiding shaft is a positioning shaft for making a movable member to move in the optical axis direction, the positioning shaft is usually held at two points of the both ends of the guiding shaft. In this case, the lager a distance between the two points is, the more the movable member operates stably.

However, when the guiding shaft is actually used in common, a distance between two points for holding the positioning shaft is restricted and as a result, the stable operation of the movable member is disturbed. In addition, because the positioning shaft is generally required to guide with higher precision than the rotation-restricting shaft due to a mechanic reason, the most favorable case is that the positioning shafts for positioning are used in common and the rotation-restricting shafts are used in common, ideally. However, because of the above-mentioned reason, this arrangement may become causes of troubles and factors for increasing the size of outer shape of the lens barrel.

The present invention is made in view of the above-mentioned circumstances, and is to provide a lens barrel which has a compact inner lens mechanism and is able to be manufactured in a small size at low cost.

SUMMARY

In order to solve the above-mentioned problem, the present invention provides a lens barrel. The lens barrel includes: a cylindrical-shaped body tube for housing an inner lens mechanism; a first movable member for holding a first movable lens, moving to an optical axis direction by guiding first positioning shafts respectively extending approximately parallel to the optical axis direction, and being restricted its rotation with a first rotation-restricting shaft; a second movable member disposed along with the first movable lens in the optical axis direction, for holding the second movable lens, moving to the optical axis direction by guiding second positioning shafts respectively extending approximately parallel to the optical axis direction, and being restricted its rotation with a second rotation-restricting shaft. The lens barrel characterized in that the first positioning shaft and the second rotation-restricting shaft are integrally formed to constitute a common guiding shaft extending across the lens barrel in the optical axis direction, one end of the first rotation-restricting shaft is fixed to a holding section provided in a middle portion of the lens barrel, and a predetermined space is formed in an extended line of the first rotation-restricting shaft.

It is to be noted that the terms "inner lens mechanism" as used herein means that a mechanism including every lens, every movable member, every positioning shaft, every rotation-restricting shaft and other mechanism to be disposed in the lens barrel.

According to the lens barrel, since the first positioning shaft and the second rotation-restricting shaft are formed to be a common guiding shaft, the number of guiding shafts can be reduced. In this case, since the first positioning shaft and the second positioning shaft are configured separately, sliding lengths for each movable member can be sufficiently obtained with respect to each positioning shaft. Accordingly, the above-mentioned distance between two points can have a sufficient length, and in a case where a sleeve section for sliding along each positioning shaft is provided on each movable member, it is possible to have a sufficient length for the sleeve section.

In addition, with the result of fixing the one end of the first rotation-restricting shaft at the holding section provided in the middle portion of the lens barrel, a predetermined space is formed in the extended line of the first rotation-restricting shaft, and other inner lens mechanism can be arranged in the space.

According to such lens barrel of the present invention, the number of shafts can be reduced by having a common guiding shaft, and also a predetermined space is formed because the first rotation-restricting shaft is shortened, and thus it is possible to realize for saving space within the lens barrel. As the result, a material cost involved with shafts can be cut down and other inner lens mechanism can be arranged in the space, so that the whole lens barrel can be made compact.

Furthermore, a sufficient sliding length of each movable member with respect to each positioning shaft can be obtained, and therefore, the lens barrel can realize stable operations of respective movable member with high precision, even in a compact size.

Additional features and advantages of the present invention are described in, and will be apparent from, the following Detailed Description and the Figures.

DETAILED DESCRIPTION

Figure 1:
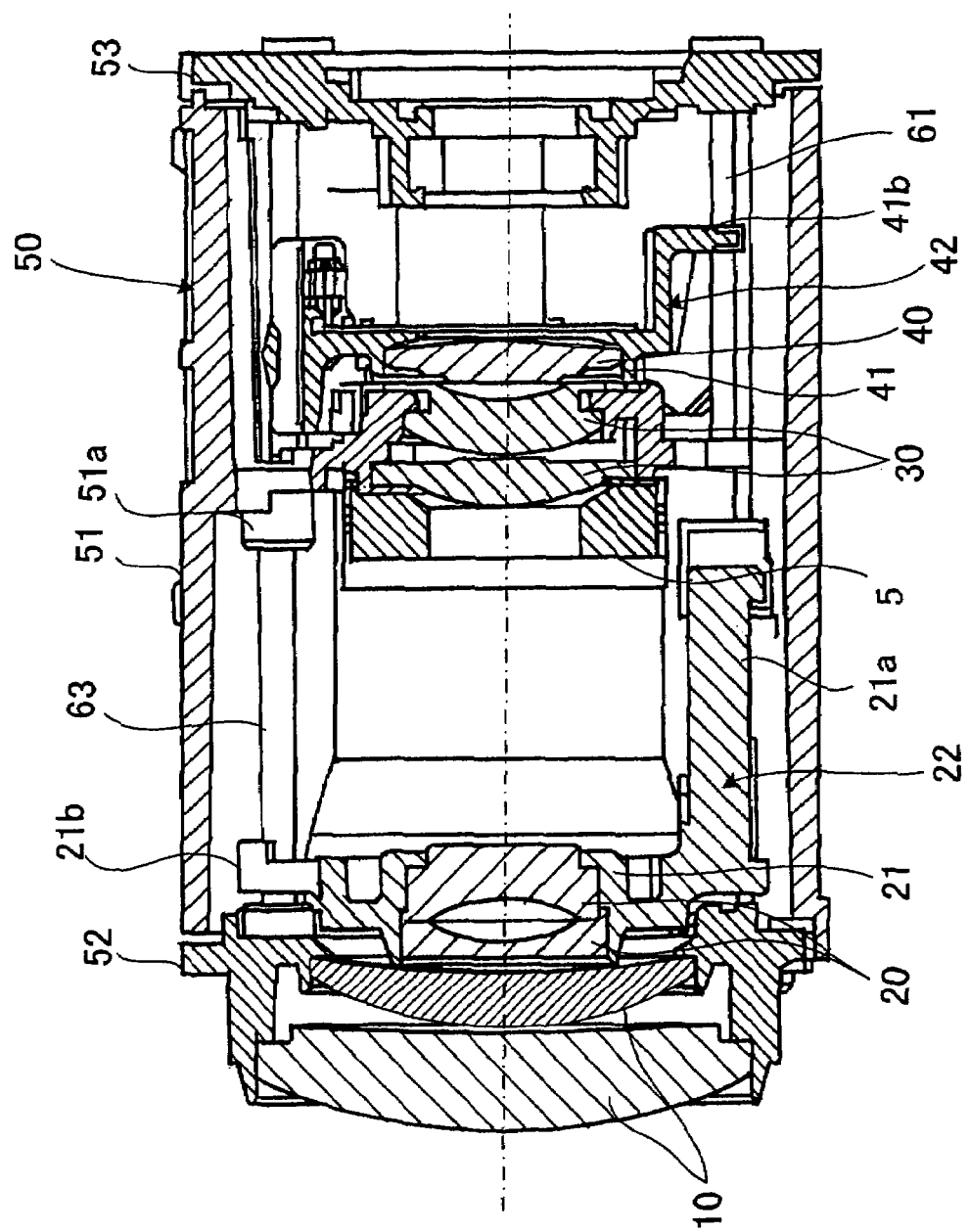
FIG. 1 is a cross-sectional view of a lens barrel according to an embodiment of the present invention.
Figure 2:
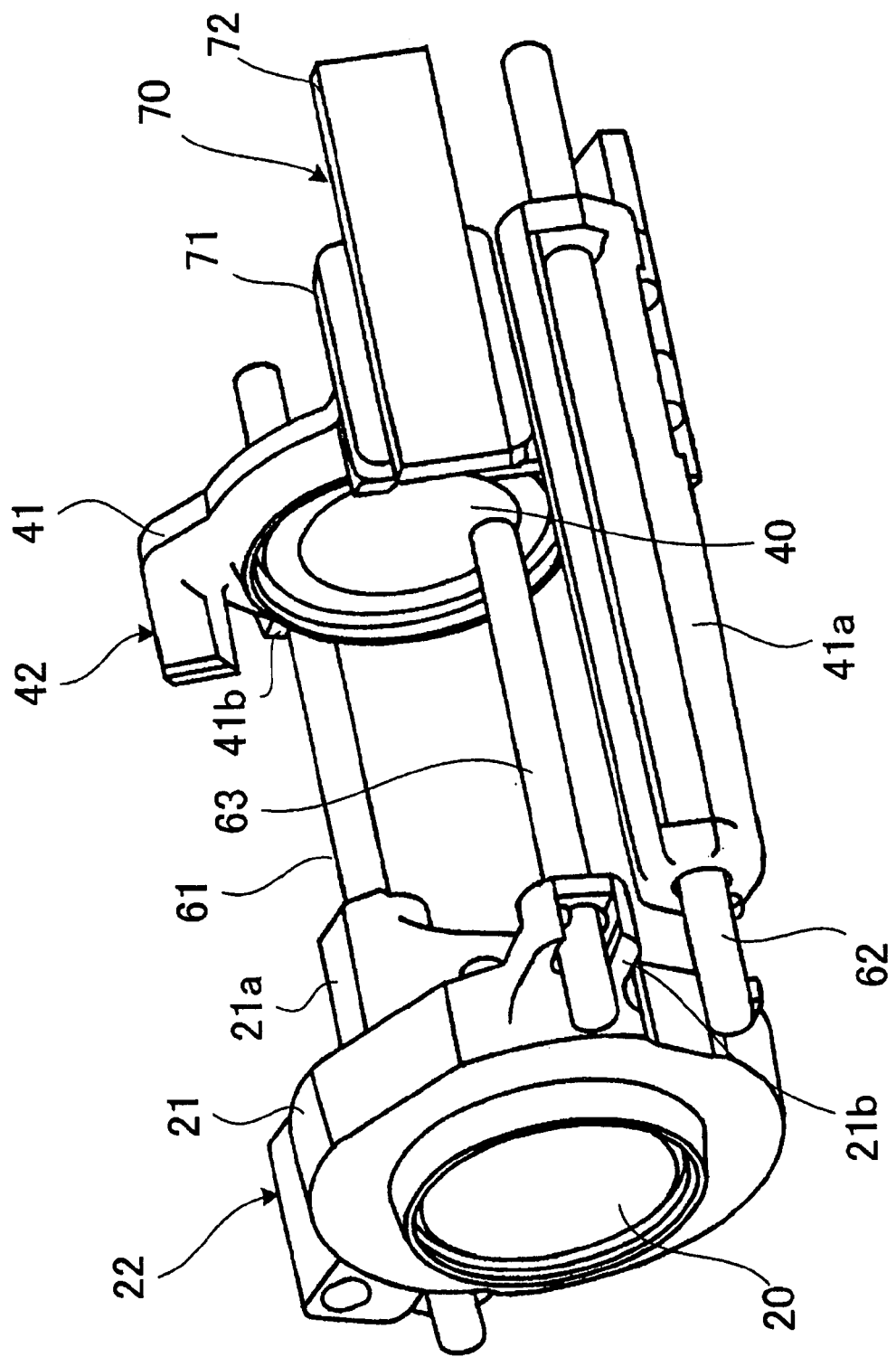
FIG. 2 is a perspective view showing an inner main portion of a lens barrel.

In the following, an embodiment of the present invention will be described in detail with reference to drawings. In the present embodiment, the present invention is applied to a lens barrel of a digital still camera. FIG. 1 is a cross-sectional view of the lens barrel of the present embodiment and FIG. 2 is a perspective view showing an inner main portion of the lens barrel. It is noted that, in the following description, it ought to express that the left side in the drawings is the front side and the right side in the drawings is the rear side, with reference to an optical axis direction (a dashed line in the drawings) in FIG. 1, for simplicity of explanation.

As shown in FIG. 1, the lens barrel of the present embodiment is configured to have inner lens mechanisms such as a first lens group 10, a second lens group 20, an iris 5, a third lens group 30, and a fourth lens group 40, which are disposed in this order from the front, in a cylindrical-shaped lens barrel 50.

The lens barrel 50 is configured with a middle lens barrel 51 constituting a main body, a front lens barrel 52 holding the first lens group 10 in an inner diameter direction and attached at the front end of the middle lens barrel 51 to close it, and a rear lens barrel 53 holding a CCD in an inner diameter direction and attached at the rear end of the middle lens barrel 51 to close it.

In addition, as shown in FIG. 2, three guiding shafts 61, 62 and 63 extending approximately parallel to the optical axis direction are provided in the lens barrel 50. Of these shafts, as for the guiding shafts 61 and 62, each one ends of them are fixed to the front lens barrel 52 and other ends are fixed to the rear lens barrel 53. On the other hand, as for the guiding shaft 63, one end thereof is fixed to the front lens barrel 52 and the other end is fixed to a holding section 51a which is provided in a middle portion of the middle lens barrel 51 so as to be slightly inwardly extended (refer to FIG. 1).

The second lens group 20 (a first movable lens) is a zoom lens for zooming and fitted and held by a ring-shaped first movable lens frame 21 to constitute a zoom movable member 22 (a first movable member). On the outer circumference portion of the first movable lens frame 21, there are provided a cylindrical-shaped sleeve section 21a extending rearwardly and for inserting the guiding shaft 61, and a flange section 21b projected outwardly at a position shifted by 180-degree from a position of the sleeve section 21a, centered the optical axis, and having a guiding hole at the center thereof for inserting the guiding shaft 63. A movement of the zoom movable member 22 to the optical direction is guided by engaging the sleeve section 21a with the guiding shaft 61 and a rotation thereof centering around the guiding shaft 61 is restricted by engaging the flange section 21b with the guiding shaft 63. In the present embodiment, the guiding shaft 61 corresponds to a first positioning shaft and the guiding shaft 63 corresponds to a first rotation-restricting shaft.

The fourth lens group 40 (a second movable lens) is a focus lens for focusing and fitted and held by a ring-shaped second movable lens frame 41 to constitute a focus movable member 42 (a second movable member). On the outer circumference of the second movable lens frame 41, there are provided a cylindrical-shaped sleeve section 41a extending frontwardly and for inserting the guiding shaft 62, and a flange section 41b projected outwardly at a position shifted by 180-degree from a position of the sleeve section 41a, centered the optical axis, and having a guiding hole at the center thereof for inserting the guiding shaft 61. A movement of the focus movable member 42 to the optical axis direction is guided by engaging the sleeve section 41a with the guiding shaft 62 and a rotation thereof centering around the guiding shaft 62 is restricted by engaging the flange section 41b with the guiding shaft 61. In the present embodiment, the guiding shaft 62 corresponds to a second positioning shaft. In addition, the guiding shaft 61 corresponds also to a second rotation-restricting shaft, which means that the guiding shaft 61 constitutes a guiding shaft common with the first positioning shaft.

It is to be noted that because the focus lens is required to move with higher precision than the zoom lens, the sleeve section 41a of the focus movable member 42 is made longer than the sleeve section 21a of the zoom movable member 22 in the present embodiment. In addition, when the focus movable member 42 is moved to the front end, the front end of the sleeve section 41a is made to come close to the front lens barrel 52, and when the focus movable member 42 moves to the rear end, the end of the sleeve section 41a is made to come close to the rear lens barrel 53. Accordingly, a distance between the front lens barrel 52 and the rear lens barrel 53 is reduced within a range enabling the focus movable member 42 to move, and therefore the whole lens barrel is configured compact.

In a space formed at a rear portion in an extended line of the guiding shaft, there is disposed a coil unit 70 of a linear motor which constitutes a driving section for moving the focus movable member 42 to the optical axis direction. The coil unit 70 is configured with a flat coil structure including a driving coil 71, a magnet 72 and a yoke which is not shown, and disposed to be housed in the lens barrel 50. It is to be noted that the zoom movable member 22 is configured to move to the optical axis direction by a stepping motor which is not shown. In the present embodiment, as lubrication of these motors such as the liner motor to drive the focus movable member 42 and the stepping motor to drive the zoom movable member 22, different greases are respectively used. However because the positioning shafts (guiding shafts 61 and 62) of the each movable member are separately configured, it is unnecessary to apply separately the greases depending on portions of each positioning shaft.

Returning to the FIG. 1, the iris 5 (aperture unit) is disposed at the front of the third lens group 30 composed of fixed lenses which is disposed between the second lens group 20 and the fourth lens group 40.

In addition, the lens barrel of the present embodiment has a centering mechanism capable of adjusting a tilt with respect to the optical axis, on the front lens barrel 52.

Specifically, eccentric pins not shown are put around the side surface of the front lens barrel 52 so as to have a space equally from each other. By making the each eccentric pin to rotate around its axis, a screw mechanism not shown can move a portion of the front lens barrel 52 where the eccentric pins put around, to a direction of approaching to or separating from (frontward or backward direction) the middle lens barrel 51 by a predetermined amount. As the result of moving the front lens barrel 52 and tilting the front lens barrel 52 with respect to the middle lens barrel 51, the first lens group 10 can be centered. In addition, at this time, since each one end of the guiding shaft 61, 62 and 63 move together with a tilt of the front lens barrel 52, tilts of these guiding shafts can be adjusted at the same time. Further, at this time, one end of the guiding shaft 63 is fixed at the front lens barrel 52 and the other side thereof is fixed at the middle portion of the middle lens barrel 51, and there is a distance between the zoom movable member 22 and the focus movable member 42, whereby moving amounts of each movable member are slightly different and then they act differently from each other. Therefore, with use of their different movements, it is possible to perform high precision centering.

As described above, according to the lens barrel in the present embodiment, since the guiding shaft 61 is served as a common guiding shaft, it is possible to reduce the number of shafts. In addition, the guiding shaft 63 is formed only within the moving range of the zoom movable member 22, the coil unit 70 is disposed in the space positioned behind the guiding shaft 63, hence the whole lens barrel can be made compact.

On the other hand, since the guiding shaft 61 (the first positioning shaft) and the guiding shaft 62 (the second positioning shaft) are formed separately, the sleeve section 21a of the zoom movable member 22 and the sleeve section 41a of the focus movable member 42 can be made to have sufficient lengths, and a sliding length for the each movable member can also be sufficiently obtained. Accordingly, even having a compact size, the lens barrel can realize stable operations of each movable member with high precision.

As described above, the preferred embodiment of the present invention has been described, however the present invention is not limited to the specific embodiment and it will be obvious that various changes and modifications may be made without departing from the scope of the invention.

For example, in the above embodiment, although it is shown the structure in which the centering mechanism is provided in the front lens barrel 52, a similar centering mechanism may be provided in the rear lens barrel 53 side or may be provided in both of the front lens barrel 52 and the rear lens barrel 53.

It is noted that in a case where the centering mechanism is provided in the rear lens barrel 53, the rotation of the eccentric pin causes the rear lens barrel 53 to move so as to tilt with respect to the middle lens barrel 51, thereby the guiding shafts 61 and 62 are tilted together with it. However the guiding shaft 63 is not directly influenced by this movement because the guiding shaft 63 is not fixed to the rear lens barrel 53. For that reason, it is caused a movement which causes moving amounts of the zoom movable member 22 and the focus movable member 42 different from the case in the above embodiment. Accordingly, it is possible to perform further fine adjustment in centering with use of the difference of the movements.

In addition, in the above embodiment, the case is shown where the zoom lens constitutes the first movable lens and the focus lens constitutes the second movable lens, however, in accordance with a structure of an inner mechanism of a lens barrel, other lenses may be used as each movable lens.

Further, the lens barrel of the present invention is not limited to a digital still camera, and can be applied to optical equipment, for example, an imaging device such as other camera or an observation device such as a magnifying lens.

INDUSTRIAL APPLICATION

The present invention can be applied to optical equipment having a lens barrel which drives a plurality of movable members holding lenses and disposed in single file in an optical axis direction, along with a guiding shaft in a body tube.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A lens barrel comprising: a cylindrical-shaped body tube for housing an inner lens mechanism; a first movable member for holding a first movable lens, moving to an optical axis direction by guiding a first positioning shaft, and being restricted rotation thereof by a first rotation-restricting shaft respectively extending parallel to the optical axis direction; a second movable member disposed along with the first movable lens in the optical axis direction, for holding a second movable lens, moving to the optical axis direction by guiding a second positioning shaft, and being restricted rotation thereof by a second rotation restriction shaft respectively extending parallel to the optical axis direction, the lens barrel comprising: the first positioning shaft and the second rotation-restricting shaft integrally formed to constitute a common guiding shaft extending between both ends of the lens barrel in the optical axis direction; wherein one end of the first rotation-restricting shaft is fixed to a holding section provided in a middle portion of the lens barrel;and wherein a predetermined space is formed in line with an axis of the first rotation-restricting shaft.

2. The lens barrel according to claim 1, further comprising:
a coil unit of a linear motor constituting a driving section for moving the second movable member is disposed in the predetermined space.

3. The lens barrel according to claim 2, wherein
the driving section has a flat coil structure and a plurality of constituent elements thereof is disposed so as to be housed in the lens barrel.

4. The lens barrel according to claim 1, wherein
the first movable lens is a zoom lens and the second movable lens is a focus lens.

5. The lens barrel according to claim 4, further comprising:
a lubrication grease for a driving actuator of the first movable lens and for a driving actuator of the second movable lens are different from each other wherein
on the first positioning shaft and on the second positioning shaft, grease is not changed depending on a portion to be applied, and one kind of grease is applied to the respective shafts to drive the respective driving actuators.

6. The lens barrel according to claim 4, wherein
the tube body has a cylindrical-shaped middle lens barrel, a front lens barrel and a rear lens barrel for closing openings at the both ends of the middle lens barrel, respectively; and
one end of the first rotation-restricting shaft is held by the front lens barrel and the other end is held at the middle portion of the middle lens barrel.

7. The lens barrel according to claim 1, wherein
the tube body has a cylindrical-shaped middle lens barrel, a front lens barrel and a rear lens barrel for closing openings at the both ends of the middle lens barrel, respectively;
one end of the first rotation-restricting shaft is held by the front lens barrel and the other end is held at the middle portion of the middle lens barrel; and
respective one ends of the first positioning shaft and the second positioning shaft are held by the front lens barrel and the other ends are held by the rear lens barrel.

8. The lens barrel according to claim 7, wherein
front lens barrel has a centering mechanism capable of adjusting a tilt with respect to an optical axis; and
the centering mechanism centers the each positioning shaft and the each rotation-restricting shaft to have tilts, respectively.

9. The lens barrel according to claim 7, wherein
the rear lens barrel has a centering mechanism capable of adjusting a tilt with respect to an optical axis; and
the centering mechanism centers the each positioning shaft is configured to have a tilt, respectively.

* * * * *